United States Patent
Matsushita

(10) Patent No.: US 10,673,255 B2
(45) Date of Patent: Jun. 2, 2020

(54) BATTERY PACK AND COMPUTER-IMPLEMENT BATTERY PACK CONTROL METHOD

(71) Applicants: Kabushiki Kaisha Toshiba, Minato-ku (JP); Toshiba Infrastructure Systems & Solutions Corporation, Kawasaki-shi (JP)

(72) Inventor: Hiroki Matsushita, Kawasaki (JP)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 276 days.

(21) Appl. No.: 15/696,804

(22) Filed: Sep. 6, 2017

(65) Prior Publication Data
US 2018/0269695 A1    Sep. 20, 2018

(30) Foreign Application Priority Data

Mar. 14, 2017   (JP) ................................. 2017-048810

(51) Int. Cl.
*H02J 7/00* (2006.01)
*H01M 10/44* (2006.01)
(Continued)

(52) U.S. Cl.
CPC ............. *H02J 7/0021* (2013.01); *H01M 2/34* (2013.01); *H01M 10/44* (2013.01); *H01M 10/48* (2013.01);
(Continued)

(58) Field of Classification Search
CPC .............................. H02J 7/0021; H02J 7/0024
(Continued)

(56) References Cited

U.S. PATENT DOCUMENTS

2005/0168194 A1\* 8/2005 Stanesti ................ H02J 7/0057
                                                              320/134
2007/0247106 A1   10/2007 Kawahara et al.
(Continued)

FOREIGN PATENT DOCUMENTS

| EP | 2 546 948 A1 | 1/2013 |
|---|---|---|
| EP | 3 113 317 A1 | 1/2017 |

(Continued)

OTHER PUBLICATIONS

Extended European Search Report dated Oct. 16, 2017 in Patent Application No. 17189370.4.

*Primary Examiner* — Richard V Muralidar
(74) *Attorney, Agent, or Firm* — Oblon, McClelland, Maier & Neustadt, L.L.P.

(57) ABSTRACT

A battery pack may include a housing, a battery in the housing, a first switch connected to the battery in the housing, a current detector, and a controller. The current detector configured to detect a current flowing to the battery, the current detector being in the housing. The controller configured to control the first switch to switch to a conductive state to flow the current to the battery if the current flowing to the battery detected by the current detector is higher than a first threshold value, and control the first switch to switch to a shut-off state to interrupt the current to the battery if the current flowing to the battery detected by the current detector is equal to or less than the first threshold value, the controller being in the housing.

19 Claims, 6 Drawing Sheets

(51) Int. Cl.
H01M 2/34 (2006.01)
H01M 10/48 (2006.01)

(52) U.S. Cl.
CPC .......... *H02J 7/0024* (2013.01); *H02J 7/0031* (2013.01); *H02J 7/0047* (2013.01); *H02J 7/0091* (2013.01); *H02J 7/00718* (2020.01); *H02J 7/007184* (2020.01); *H02J 7/0048* (2020.01); *H02J 7/00302* (2020.01); *H02J 7/00304* (2020.01); *H02J 7/00306* (2020.01)

(58) Field of Classification Search
USPC .......................................... 320/112, 134–136
See application file for complete search history.

(56) References Cited

U.S. PATENT DOCUMENTS

| | | | |
|---|---|---|---|
| 2011/0248681 A1* | 10/2011 | Miller | ................ H02J 7/0018 320/126 |
| 2013/0106178 A1 | 5/2013 | Girard et al. | |
| 2013/0200847 A1 | 8/2013 | Kurokawa et al. | |
| 2013/0241480 A1 | 9/2013 | Kirimoto et al. | |
| 2013/0249483 A1 | 9/2013 | Takashida | |
| 2014/0191705 A1 | 7/2014 | Takao et al. | |
| 2015/0372512 A1 | 12/2015 | Umemura et al. | |
| 2017/0005482 A1 | 1/2017 | Matsushita | |

FOREIGN PATENT DOCUMENTS

| | | | |
|---|---|---|---|
| JP | 3-93430 | A | 4/1991 |
| JP | 5-328629 | A | 12/1993 |
| JP | 7-85893 | A | 3/1995 |
| JP | 8-140271 | A | 5/1996 |
| JP | 8-163786 | A | 6/1996 |
| JP | 10-304588 | A | 11/1998 |
| JP | 2002-25594 | A | 1/2002 |
| JP | 2003-102167 | A | 4/2003 |
| JP | 2006-256609 | A | 9/2006 |
| JP | 2006-311669 | A | 11/2006 |
| JP | 2007-282375 | A | 10/2007 |
| JP | 2008-96140 | A | 4/2008 |
| JP | 4130605 | B2 | 8/2008 |
| JP | 2008-275524 | A | 11/2008 |
| JP | 2009-225632 | A | 10/2009 |
| JP | 2010-523071 | A | 7/2010 |
| JP | 2012-26774 | A | 2/2012 |
| JP | 2012-227986 | A | 11/2012 |
| JP | 2013-102625 | A | 5/2013 |
| JP | 2013-219964 | A | 10/2013 |
| JP | 5615995 | B1 | 10/2014 |
| JP | 5688554 | B2 | 3/2015 |
| JP | 2015-63159 | A | 4/2015 |
| JP | 2016-10198 | A | 1/2016 |
| JP | 5891441 | B2 | 3/2016 |
| JP | 5974500 | B2 | 8/2016 |
| JP | 2017-17821 | A | 1/2017 |

* cited by examiner

BATTERY PACK AND COMPUTER-IMPLEMENT BATTERY PACK CONTROL METHOD

CROSS-REFERENCE TO RELATED APPLICATION

This application is based upon and claims the benefit of priority from Japanese Patent Application No. 2017-048810, filed Mar. 14, 2017; the entire contents of which are incorporated herein by reference.

FIELD

Embodiments described herein relate generally to the field of a battery pack and a computer-implemented battery pack control method.

BACKGROUND

In control of charging of a battery, techniques for prohibiting charging when the battery is at a high temperature or prohibiting charging when the battery reaches a predetermined voltage or higher in order to suppress deterioration of the battery have been disclosed. However, conventional techniques do not consider charging (e.g., trickle charging) of a battery using a weak current which causes deterioration of the battery to progress.

BRIEF DESCRIPTION ON THE DRAWINGS

DETAILED DESCRIPTION

Figure 1:
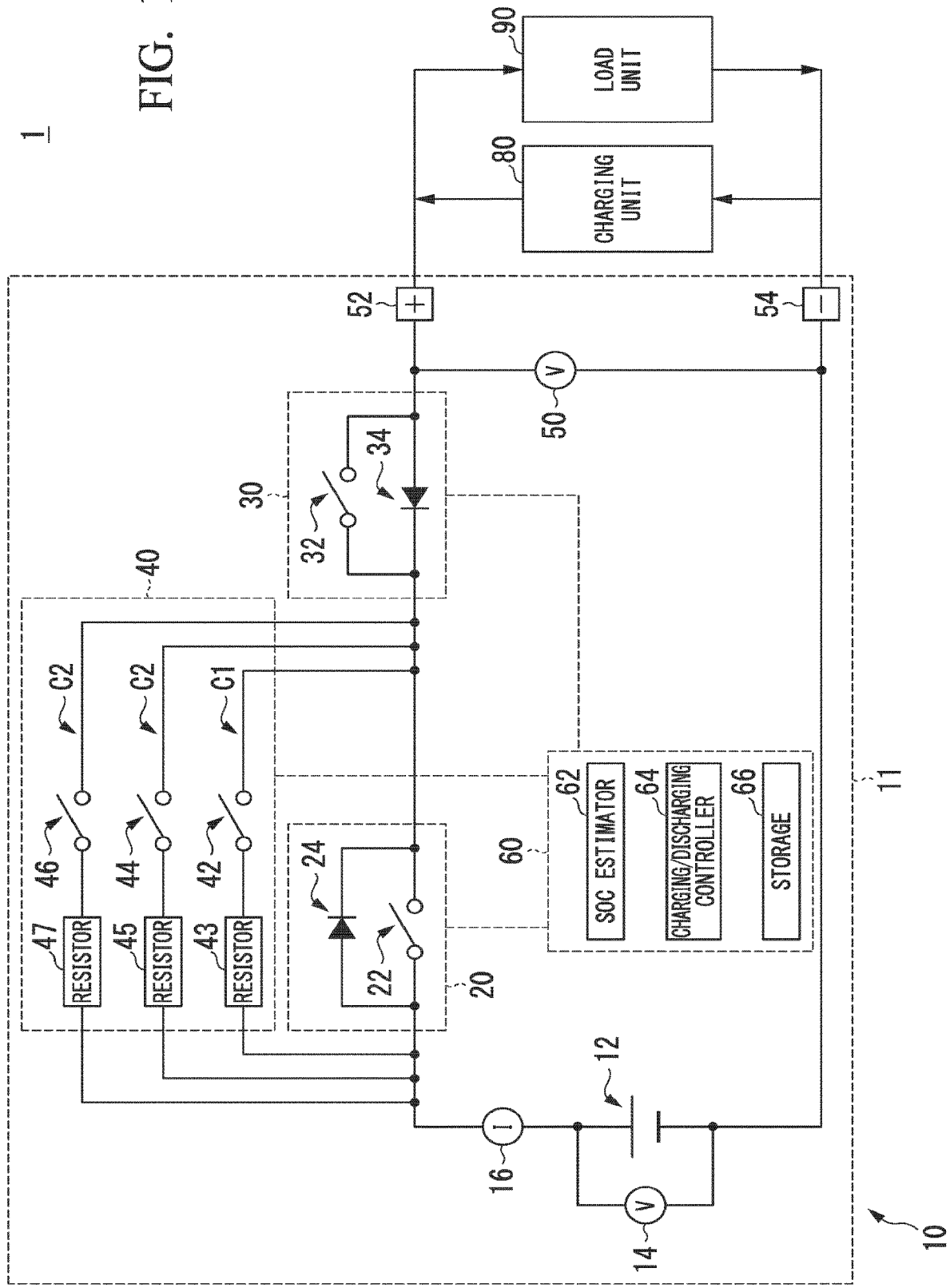
FIG. 1 is a diagram illustrating a configuration and a use environment of a battery pack.

In some embodiments, A battery pack comprising: a housing; a battery in the housing; a first switch connected to the battery in the housing; a current detector configured to detect a current flowing to the battery, the current detector being in the housing; a controller configured to control the first switch to switch to a conductive state to flow the current to the battery if the current flowing to the battery detected by the current detector is higher than a first threshold value, and control the first switch to switch to a shut-off state to interrupt the current to the battery if the current flowing to the battery detected by the current detector is equal to or less than the first threshold value, the controller being in the housing.

In some embodiments, the battery pack further may include, but is not limited to: the battery has a higher charge efficiency or discharge efficiency per unit time than a lead battery.

In some embodiments, the battery pack further may include, but is not limited to: a voltage detector configured to detect a voltage of the battery, wherein the controller configured to; control the first switch to switch to the shut-off state if the current flowing to the battery detected by the current detector is equal to or less than the first threshold value and the voltage detected by the voltage detector is equal to or higher than a second threshold value; and, control the first switch to switch to the conductive state if the current flowing to the battery detected by the current detector is higher than the first threshold value or the voltage detected by the voltage detector is less than the second threshold value.

In some embodiments, the battery pack further may include, but is not limited to: an estimator configured to estimate charge capacity of the battery, wherein the controller configured to; control the first switch to switch to the shut-off state if the current flowing to the battery detected by the current detector is equal to or less than the first threshold value and the charge capacity estimated by the estimator is equal to or higher than a third threshold value; and, control the first switch to switch to the conductive state if the current flowing to the battery detected by the current detector is higher than the first threshold value or the charge capacity estimated by the estimator is less than the third threshold value.

In some embodiments, the battery pack further may include, but is not limited to: a voltage detector configured to detect a voltage of the battery; and an estimator configured to estimate charge capacity of the battery, wherein the controller configured to; control the first switch to switch to the shut-off state if the current flowing to the battery detected by the current detector is equal to or less than the first threshold value, the voltage detected by the voltage detector is equal to or higher than a second threshold value, and the charge capacity estimated by the estimator is equal to or higher than a third threshold value; and control the first switch to switch to the conductive state if the current flowing to the battery detected by the current detector is higher than the first threshold value, the voltage detected by the voltage detector is less than the second threshold value, or the charge capacity estimated by the estimator is less than the third threshold value.

In some embodiments, the battery pack further may include, but is not limited to: a second switch connected to the battery, wherein the controller configured to control the first switch to switch to the shut-off state to interrupt the current flowing to the battery and control the second switch to switch to the conductive state to allow discharging of the battery.

In some embodiments, A computer-implemented battery pack control method comprising: detecting a current flowing to the battery in a housing, controlling a first switch to switch to a conductive state to flow the current to the battery if the current flowing to the battery detected is higher than a first threshold value, controlling the first switch to switch to a shut-off state to interrupt the current to the battery if the current flowing to the battery detected is equal to or less than the first threshold value, the first switch connected to the battery being in the housing.

A battery pack of embodiments will be described below with reference to the attached drawings.

First Embodiment

FIG. 1 is a diagram illustrating a configuration and a use environment of a battery pack 10. For example, the battery pack 10 is connected to a charging unit 80 and a load unit 90 via an electric power line. The battery pack 10 is charged with a current supplied from the charging unit 80 and provides electric power to the load unit 90. For example, the battery pack 10 accommodates a battery 12, an internal voltage detector 14, a current detector 16, a first switch circuit 20, a second switch circuit 30, a precharge circuit 40, an external voltage detector 50, a positive electrode terminal 52, a negative electrode terminal 54, and a controller 60 in a housing 11. The positive electrode terminal 52 is an example of an "external terminal."

For example, the battery 12 is a secondary battery, such as a lithium ion battery or a sodium ion battery, which has higher charge efficiency or discharge efficiency per unit time than a lead battery. For example, the battery 12 may include a plurality of battery cells connected in series or in parallel. One end of the battery 12 is connected to the first switch circuit 20 via the electric power line and the other end is connected to the negative electrode terminal 54 via the electric power line.

The internal voltage detector 14 is connected in parallel with the battery 12 via the electric power line. One end of the internal voltage detector 14 is connected between the current detector 16 and the battery 12 via the electric power line and the other end is connected between the battery 12 and the negative electrode terminal 54 via the electric power line. The internal voltage detector 14 detects the voltage of the battery 12. The internal voltage detector 14 outputs a signal indicating the detected voltage to the controller 60.

The current detector 16 is connected to the battery 12 and the first switch circuit 20 via the electric power line in series. One end of the current detector 16 is connected to the first battery 12 via the electric power line and the other end is connected to the first switch circuit 20 via the electric power line. The current detector 16 detects a current charged/discharged to/from the battery 12. The current detector 16 outputs a signal indicating the detected current to the controller 60.

For example, the first switch circuit 20 includes a first switch 22 and a first diode 24 which are connected in parallel via the electric power line. For example, the first switch 22 is a field effect transistor (FET). In addition, the first switch 22 may be a power relay circuit. One end of the first switch 22 is connected to the battery 12 via the electric power line and the other end thereof is connected to the second switch circuit 30 via the electric power line. The first switch 22 switches to a conductive state or a shut-off state under the control of the controller 60. When the first switch 22 is in the conductive state, electric power supplied from a device connected to the battery pack 10 is stored in the battery 12. When the first switch 22 switches to the shut-off state, charging current is interrupted.

The diode 24 is connected in parallel with the first switch 22, one end thereof is connected between the first switch 22 and current detector 16 via the electric power line, and the other end thereof is connected between the second switch circuit 30 and the first switch 22. The diode 24 allows the current supplied from the battery 12 to flow to the second switch circuit 30 and thus the electric power of the battery 12 is supplied to the load unit 90 via the electric power line.

For example, the second switch circuit 30 includes a second switch 32 and a second diode 34 connected in parallel with each other via the electric power line. For example, the second switch 32 is an FET. In addition, the second switch 32 may be a power relay circuit. One end of the second switch 32 is connected between the first switch circuit 20 and the diode 34 via the electric power line, and the other end thereof is connected between the positive electrode terminal 52 and the diode 34 via the electric power line. The second switch 32 switches to a conductive state or a shut-off state under the control of the controller 60. When the second switch 32 is in the conductive state, electric power output from the battery pack 10 is supplied to a device connected to the positive electrode terminal 52.

The diode 34 is connected in parallel with the second switch 32, one end thereof is connected to the first switch circuit 20 via the electric power line, and the other end thereof is connected to the positive electrode terminal 52 via the electric power line. The diode 34 allows the current supplied from a device connected to the battery pack 10 to flow to the first switch circuit 20, and thus electric power is stored in the battery 12. Accordingly, when the first switch 22 is in the conductive state and the second switch 32 which will be described below is in the shut-off state, a device connected to the battery pack 10 is blocked from the battery pack 10.

For example, the precharge circuit 40 includes first, second and third precharge circuits C1 to C3. For example, the first precharge circuit C1 includes a first precharge switch 42 and a first precharge resistor 43. One end of the first precharge switch 42 is connected to the first precharge resistor 43 via the electric power line and the other end thereof is connected between the first switch circuit 20 and the second switch circuit 30 via the electric power line. One end of the first precharge resistor 43 is connected between the current detector 16 and the first switch circuit 20 via the electric power line, and the other end thereof is connected to the first precharge switch 42 via the electric power line. The first, second and third precharge circuits C1 to C3 are connected in parallel.

For example, the second precharge circuit C2 includes a second precharge switch 44 and a second precharge resistor 45. The second precharge switch 44 and the second precharge resistor 45 are connected similar to the first precharge switch 42 and the first precharge resistor 43 of the first precharge circuit C1 via the electric power line. For example, the third precharge circuit C3 includes a third precharge switch 46 and a third precharge resistor 47. The third precharge switch 46 and the third precharge resistor 47 are connected like the first precharge switch 42 and the first precharge resistor 43 of the first precharge circuit C1 via the electric power line.

Here, the resistance value of the first precharge resistor 43 is "Rp1," the resistance value of the second precharge resistor 45 is "Rp2" and the resistance value of the third precharge resistor 47 is "Rp3." The resistance values have a relationship of Rp1>Rp2>Rp3, for example. In addition, when the first precharge switch 42, the second precharge switch 44 and the third precharge switch 46 are not distinguished from one another, they are simply referred to as "precharge switch" hereinafter.

The other ends of the precharge switches 42, 44 and 46 may be connected between the second switch circuit 30 and the positive electrode terminal 52 via the electric power line.

The external voltage detector 50 detects a voltage across the positive electrode terminal 52 and the negative electrode terminal 54. The external voltage detector 50 outputs a signal indicating the detected voltage to the controller 60. One end of the external voltage detector 50 is connected between the second switch circuit 30 and the positive electrode terminal 52 via the electric power line, and the other end is connected between the battery 12 and the negative electrode terminal 54 via the electric power line. For example, the positive electrode terminal 52 and the negative electrode terminal 54 may include connectors which can connect a power line connected to an external device such as an electric device mounted in a vehicle. The positive electrode terminal 52 is connected to the second switch circuit 30 and the load unit 90 in series via the electric power line. One end of the positive electrode terminal 52 is connected to the second switch circuit 30 via the electric power line and the other end is connected to the load unit 90 via the electric power line. The negative electrode terminal 54 is connected to the battery 12 and the load unit 90 in series via the electric power line. One end of the negative electrode terminal 54 is connected to the battery 12 via the electric power line and the other end is connected to the load unit 90 via the electric power line.

The charging unit 80 is a circuit which supplies a current to the battery 12 to charge the battery 12. One end of the charging unit 80 is connected between the load 90 and the positive electrode terminal 52 via the electric power line, and the other end is connected between the load 90 and the negative electrode terminal 54 via the electric power line. The load unit 90 includes an electric apparatus which operates according to electric power supplied from the battery 12. For example, the load unit 90 includes an auxiliary machine mounted on a vehicle. One end of the load unit 90 is connected to the positive electrode terminal 52 via the electric power line and the other end is connected to the negative electrode terminal 54 via the electric power line.

For example, the controller 60 includes an SOC estimator 62, a charging/discharging controller 64, and a storage 66. One or both of the SOC estimator 62 and the charging/discharging controller 64 may be realized by executing a program through a processor such as a central processing unit (CPU). Furthermore, one or both of the SOC estimator 62 and the charging/discharging controller 64 may be realized by circuitry or hardware such as large scale integration (LSI), an application specific integrated circuit (ASIC) or a field-programmable gate array (FPGA) and have a circuit configuration for realizing functions of one or both of the SOC estimator 62 and the charging/discharging controller 64. In addition, one or both of the SOC estimator 62 and the charging/discharging controller 64 may be realized by software and hardware in cooperation.

For example, the storage 66 is realized by a non-volatile storage medium such as a read only memory (ROM), a flash memory or an SD card, or a volatile storage medium such as a random access memory (RAM) or a register. The storage 66 stores a program executed by a processor, and information which is acquired in advance through tests and the like and indicates the internal resistance, charge characteristics and discharge characteristics of the battery 12. The charge characteristics of the battery 12 are, for example, a relationship between the voltage of the battery 12 during charging and a ratio of charge to battery capacity (state of charge (SOC)), and the discharge characteristics of the battery 12 are, for example, a relationship between the voltage of the battery 12 during discharging and discharge capacity. In addition, the storage 66 stores a detection result of the internal voltage detector 14, the current detector 16 or the external voltage detector 50.

For example, the SOC estimator 62 estimates the charge capacity of the battery 12 using the information, which is stored in the storage 66 and indicates the internal resistance, charge characteristics and discharge characteristics of the battery 12, and the detection result of the internal voltage detector 14.

The charging/discharging controller 64 charges the battery 12 by controlling the first switch 22 to switch to the conductive state. If a charging current detected by the current detector 16 is equal to or less than a first threshold value when charging is performed, the charging/discharging controller 64 controls the first switch 22 to switch to the shut-off state to interrupt the current flowing through the battery 12.

In addition, the charging/discharging controller 64 performs the following control and computation in order to determine whether it is appropriate to connect the battery 12 to the charging unit 80. The charging/discharging controller 64 sequentially controls the first precharge switches 42, 44 and 46 to switch to a conductive state to acquire a detection result (internal voltage V1 hereinafter) of the internal voltage detector 14, a detection result (external voltage V2) of the external voltage detector 50, and a detection result (current I hereinafter) of the current detector 16.

In the following description, the internal voltage is an internal voltage V1-1, the external voltage is an external voltage V2-1, and the charging current flowing through the battery 12 is a charging current I-1 when the precharge circuit C1 is in a conductive state. In addition, the numeral "2" after hyphens indicates an internal voltage V1-2, an external voltage V2-2 and a charging current I-2 when the precharge circuit C2 is in a conductive state, and the numeral "3" following hyphens indicates an internal voltage V1-3, an external voltage V2-3 and a charging current I-3 when the precharge circuit C3 is in a conductive state.

In addition, the charging/discharging controller 64 derives the voltage (charging unit voltage Vx hereinafter) output from the charging unit 80, the resistance value (charging unit resistance value Rx1 hereinafter) of the charging unit 80, or the resistance value (load unit resistance value Rx2) of the load unit 90 on the basis of a process which will be described below. Further, the charging/discharging controller 64 estimates a maximum current Imax if the precharge switches 42, 44 and 46 are in a shut-off state and the first switch 22 is in the conductive state.

The charging/discharging controller 64 derives the voltage value Vx of the charging unit 80, the charging unit resistance value Rx1 and the load unit resistance value Rx2 which are unknown numbers by solving the following equations (1) to (3) on the basis of the internal voltages V1-1 to V1-3, the external voltages V2-1 to V2-3, and the currents I-1 to I-3 acquired by sequentially controlling the precharge switches to switch to the shut-off state.

$$I\text{-}1 = (V2\text{-}1 - Vx)/Rx1 + V2\text{-}1/Rx2 \tag{1}$$

$$I\text{-}2 = (V2\text{-}2 - Vx)/Rx1 + V2\text{-}2/Rx2 \tag{2}$$

$$I\text{-}3 = (V2\text{-}3 - Vx)/Rx1 + V2\text{-}3/Rx2 \tag{3}$$

Subsequently, the charging/discharging controller 64 derives an external voltage V# when the precharge switches 42, 44 and 46 are in the shut-off state and the first switch 22 is in the conductive state by assigning the derived voltage value Vx, charging unit resistance value Rx1 and load unit resistance value Rx2 to the following equation (4). "E1" is the voltage of the battery 12. "R#" is the internal resistance value of the battery 12.

$$(E1 - V\#)/R\# = (V\# - Vx)/Rx1 + V\#/Rx2 \tag{4}$$

Further, the charging/discharging controller 64 derives a maximum current Imax when the precharge switches 42, 44 and 46 are in the shut-off state and the first switch 22 is in the conductive state by solving the following equation (5).

$$Imax=(V\#-Vx)/Rx+FV\#/Rx2 \tag{5}$$

The charging/discharging controller 64 determines whether the derived current Imax is equal to or less than an allowable current value allowed by (switches included in) the circuit of the battery pack 10. If the current Imax is not equal to or less than the allowable current value, the charging/discharging controller 64 controls the first switch 22, the second switch 32, the first precharge switch 42, and the second precharge switch 44 to switch to the shut-off state and controls the third precharge switch 46 to switch to the conductive state in order to eliminate a voltage difference between the battery pack 10 and the charging unit 80, and stands by until the voltage difference is eliminated.

If the current Imax is equal to or less than the allowable current value, the charging/discharging controller 64 controls the precharge switches 42, 44 and 46 to switch to the shut-off state and controls the first switch 22 (or the first switch 22 and the second switch 32) to switch to the shut-off state. Accordingly, the battery 12 is charged.

In this manner, the charging/discharging controller 64 restrains a charging current which exceeds the allowable current value from flowing to the battery 12 and allows a charging current which is equal to or less than the allowable current value to flow to the battery 12.

[Weak Current Interruption Process]

Figure 2:
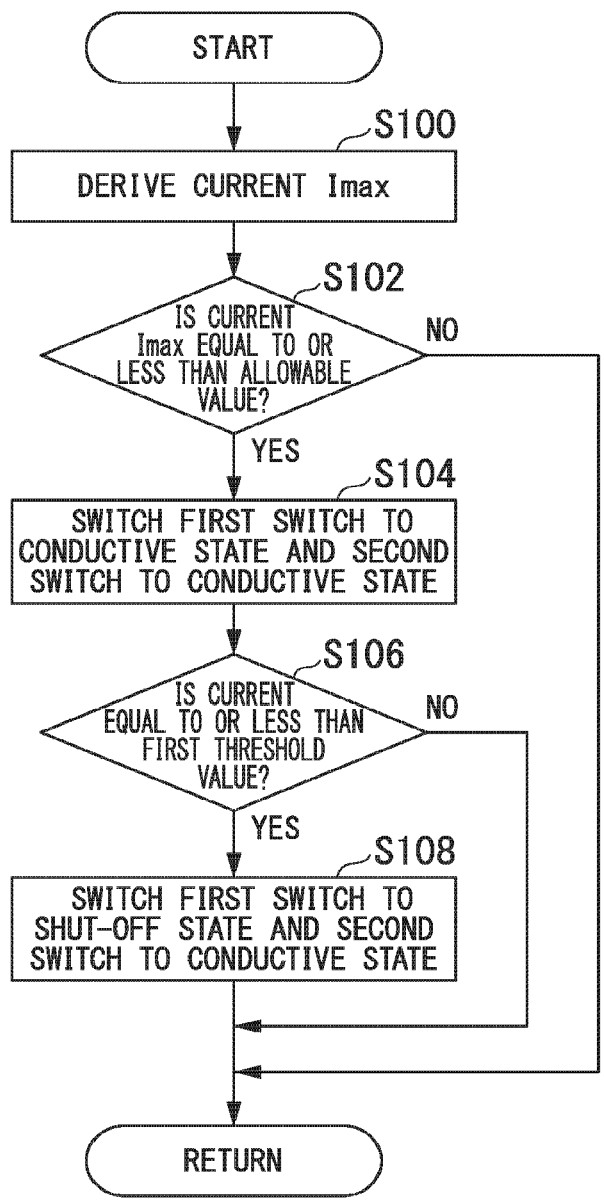
FIG. 2 is a flowchart illustrating a flow of a weak current interruption process executed by a charging/discharging controller.

In addition, If a charging current is equal to or less than the first threshold value (If the charging current is a weak current), the charging/discharging controller 64 controls the first switch 22 to switch to the shut-off state and suppresses flowing of the weak current to the battery 12. FIG. 2 is a flowchart illustrating a flow of a process including a weak current interruption process executed by the charging/discharging controller 64. For example, this flowchart is executed if the first switch 22 is controlled to conductive state and the second switch 32 is controlled to shut-off state when charging is performed. First, the charging/discharging controller 64 derives the current Imax, for example, using the aforementioned method (step S100) and determines whether the derived current Imax is equal to or less than an allowable value (step S102).

If the current is not equal or less than the allowable value, the process of one routine of the flowchart ends. If the current Imax is equal to or less than the allowable value, the charging/discharging controller 64 controls the first switch 22 and the second switch 32 to switch to the conductive state (step S104).

Subsequently, the charging/discharging controller 64 determines whether the charging current detected by the current detector 16 is equal to or less than the first threshold value (step S106). If the charging current is not equal to or less than the first threshold value, the process of one routine of the flowchart ends. If the charging current is equal to or less than the first threshold value, the charging/discharging controller 64 controls the first switch 22 to switch to the shut-off state and controls the second switch 32 to switch to the conductive state (step S108). Accordingly, charging of the battery 12 is prohibited and discharging from the battery 12 is allowed. Meanwhile, discharging of a weak current from the battery 12 does not affect the progress of deterioration of the battery 12 compared to a case in which a weak current is charged in the battery 12. Accordingly, the process of one routine of the flowchart ends.

In addition, the charging/discharging controller 64 may control the first switch 22 to switch to the shut-off state and controls the second switch 32 to switch to the conductive state If a state in which the charging current is equal to or less than the first threshold value lasts for a predetermined time (e.g., about tens of minutes to one hour). This is because frequent control affects each part of the battery pack 10.

As described above, the first switch 22 is controlled to switch to the shut-off state If the charging current detected by the current detector 16 is equal to or less than the first threshold value, and thus the current charged in the battery 12 is interrupted and the progress of deterioration of the battery 12 is suppressed.

Figure 3:
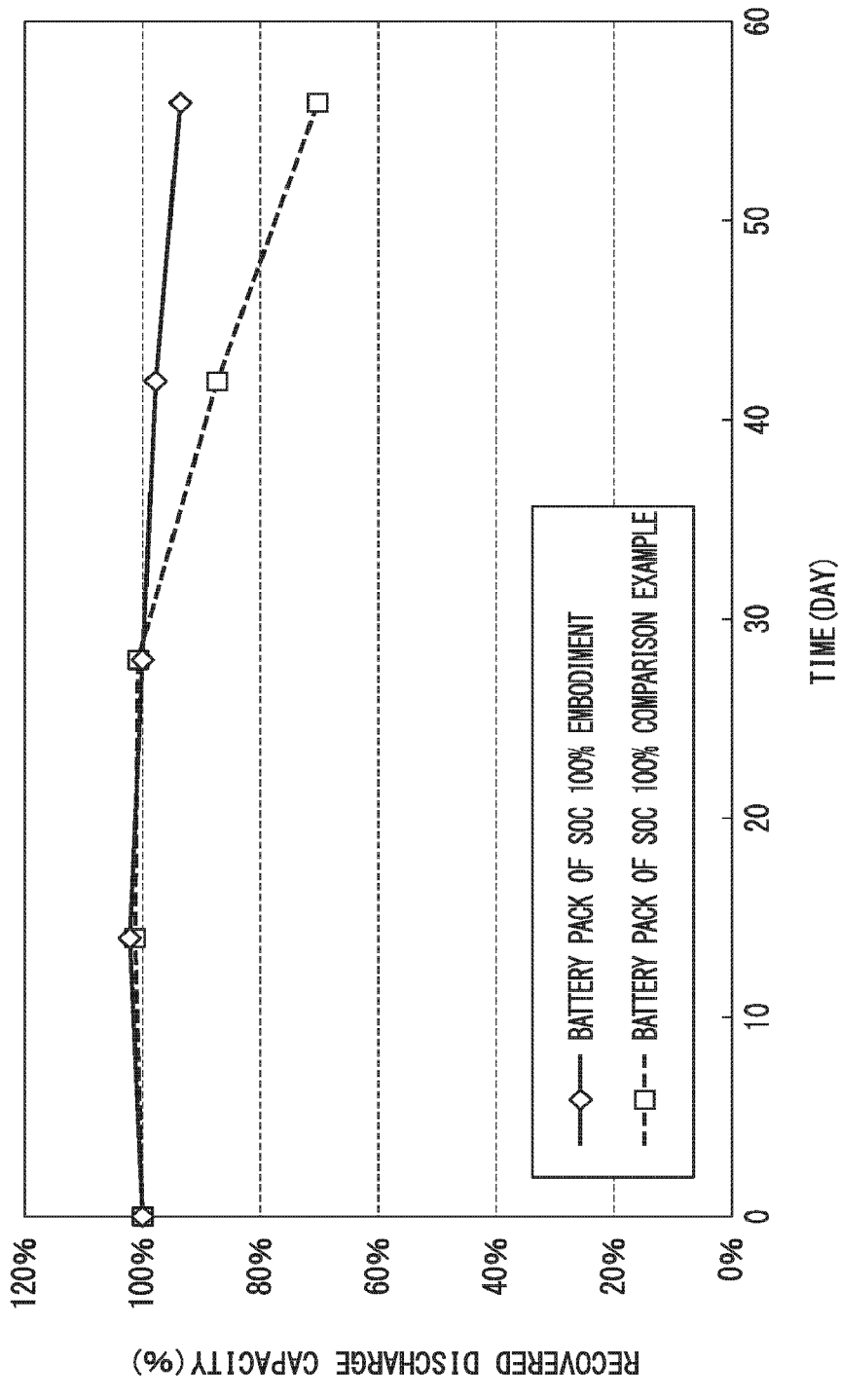
FIG. 3 is a diagram illustrating an experimental result of comparison of capacity variations with time between the battery pack of the present embodiment and a battery pack of a comparison example.

FIG. 3 is a diagram illustrating an experimental result of comparison of capacity variations with time between the battery pack 10 of the present embodiment and a battery pack of a comparison example. A process of interrupting a weak current after full charging has been performed on the battery pack 10 of the embodiment, whereas the process of interrupting a weak current after full charging has not been performed on the battery pack 10 of the comparison example. The vertical axis of FIG. 3 represents recovered discharge capacity (%) and the horizontal axis represents time (in days). Measurement target batteries are lithium ion batteries having the same specifications. The temperature condition is set to 70° C. at which lithium ion batteries easily deteriorate. In the figure, a solid line indicates a measurement value of the battery pack 10 of the present embodiment and a dotted line indicates a measurement value of the battery pack of the comparison example. In addition, the measurement values of the solid line and the dotted line indicate capacities (recovered discharge capacities) when SOC reaches 100% after recharging of the battery 12 of the present embodiment and the battery of the comparison example. Recovered discharge capacity is the ratio of current capacity to capacity when SOC is 100% in a case in which deterioration does not occur.

As illustrated, although the recovered discharge capacity of the battery pack of the comparison example considerably decreases as time passes, a decrease in the recovered discharge capacity of the battery pack 10 of the present embodiment is suppressed compared to the recovered discharge capacity of the battery pack of the comparison example. More specifically, when "measurement value of the battery pack of the comparison example" is examined, decomposition of the electrolyte of the lithium ion battery is accelerated according to charging of the weak current (details will be described below), and thus the recovered discharge capacity becomes 70% of the initial recovered discharge capacity after 56 days. On the other hand, when "measurement value of the battery pack 10 of the present embodiment" is examined, the recovered discharge capacity remains at 93% of the initial recovered discharge capacity even after 56 days have elapsed when charging using a weak current is prohibited.

In addition, in "measurement value of the battery pack of the comparison example" and "measurement value of the battery pack 10 of the present embodiment," the number of days for which the recovered discharge capacity reaches 80% can be estimated as "48.7 days" and "81.3 days," and thus the lifetime of the lithium ion battery on which a countermeasure against a weak current has been performed is 1.67 times the lifetime of the lithium ion battery on which no countermeasure has been performed. As a result, it is possible to effectively suppress the progress of deterioration of a battery by performing the countermeasure against a weak current.

For example, when a battery such as a lithium ion battery is charged with a weak current (trickle charging), for example, the battery rapidly deteriorates in some cases. For example, trickle charging is a method of separating a battery from an electric device, operating the electric device using an external power supply device and flowing a weak current to the battery by the power supply device to maintain a full charge state. In this case, the external power supply device maintains the weak current by decreasing the voltage when the charging current increases or performing feedback control using the charging current.

Particularly, in a state in which the charge rate of the battery 12 is high or in a full charge state, when charging using a weak current is performed in order to maintain such a state, the battery easily deteriorates for the reason described below. For example, in a full charge state or the like, the electrolyte inside a lithium ion battery is activated, and when energy due to a weak current is supplied in the activated state, a side effect such as a decrease in lithium ion mobility is generated with decomposition of the electrolyte. Due to such a side effect, deterioration of the battery, such as a cell capacity decrease and an internal resistance increase of the battery, proceeds in some cases.

To suppress the aforementioned progress of deterioration, for example, float charging is performed in some cases. Float charging is a charging method by which a charging unit connected to a battery pack flows a current to a load and the like using a bypass circuit instead of flowing a current to a battery when the battery has been fully charged such that the battery is in a state in which only a voltage is applied to the battery to maintain the battery in a full charge state.

However, a charging unit mounted on a vehicle or the like may continue to charge a battery by flowing a weak current to the battery in the same manner as trickle charging even when the charging unit performs float charging to fully charge the battery in a state in which the battery supplies a current to an external load of the battery pack when the charge rate of the battery is high (or in the case of approximately full charging).

Conversely, in the present embodiment, it is possible to suppress the progress of deterioration of the battery by controlling the first switch 22 to switch to the shut-off state to interrupt a current charged in the battery 12 when the current detected by the current detector 16 is equal to or less than the first threshold value. Particularly, in the present embodiment, the supplied weak current is interrupted when the battery 12 is fully charged and thus the progress of deterioration of the battery is suppressed more effectively.

Meanwhile, there is a case in which a lead battery is mounted in a vehicle as a battery for the vehicle. When electronic devices such as a communication device and a server apparatus are used in such a vehicle, operating time of the lead battery decreases and charging time thereof increases in some cases. In addition, when a lead battery having large charge/discharge capacity is used in order to increase operating time and decrease charging time, the size of the battery increases and thus the battery occupies a large space in the vehicle. Accordingly, there are cases in which a lithium ion battery having large charge/discharge capacity replaces a lead battery in a vehicle having a lead battery mounted therein.

In such a case, in order to change a program for executing control of charging of a battery in a vehicle, it is necessary for a user to bring the vehicle to a dealership and update the program, which is cumbersome. Accordingly, a program based upon the premise of charging of the lead battery may be executed to charge a lithium ion battery. The program based upon the premise of charging of the lead battery executes a process of supplying a weak current to the lead battery or gradually increasing a current supplied to the battery because hydrogen is generated or heat is generated when a large current flows to the lead battery.

Specifically, when the program based upon the premise of charging of the battery is executed, for example, the vehicle supplies a current to the lithium ion battery while gradually increasing the current from 10 mA to 1 A. In this case, the lithium ion battery easily deteriorates in a period in which a weak current equal to or less than 100 mA flows to the battery. Further, when the lead battery remains in a discharged state, the performance may considerably deteriorate due to the phenomenon called sulfation. To prevent this, trickle charging is performed. However, charging using a weak current such as trickle charging causes deterioration of the lithium ion battery to progress. When the lithium ion battery is applied while the control program for the lead battery remains, inconvenience occurs.

Accordingly, when the program based on the premise of battery charging is executed in a vehicle, the charging/discharging controller 64 of the present embodiment also interrupts supply of a weak current to the battery. Consequently, the progress of deterioration of the battery is suppressed.

Meanwhile, although an example in which the battery pack 10 is mounted in a vehicle has been described, the present invention is not limited thereto, and the battery pack 10 may be mounted in electronic devices such as smartphones and personal computers or electric devices such as an uninterruptible power system (UPS).

According to the first embodiment described above, if a current equal to or less than the first threshold value is detected by the current detector 16, the charging/discharging controller 64 can control the first switch 22 to switch to the shut-off state to interrupt the current flowing to the battery 12, thereby suppressing the progress of deterioration of the battery.

Second Embodiment

A second embodiment will be described below. In the second embodiment, the charging/discharging controller 64 controls the first switch 22 to switch to the shut-off state if a current equal to or less than the first threshold value is detected by the current detector 16 and a voltage detected by the internal voltage detector 14 is equal to or higher than a second threshold value. Hereinafter, a description will be given on the basis of differences from the first embodiment.

Figure 4:
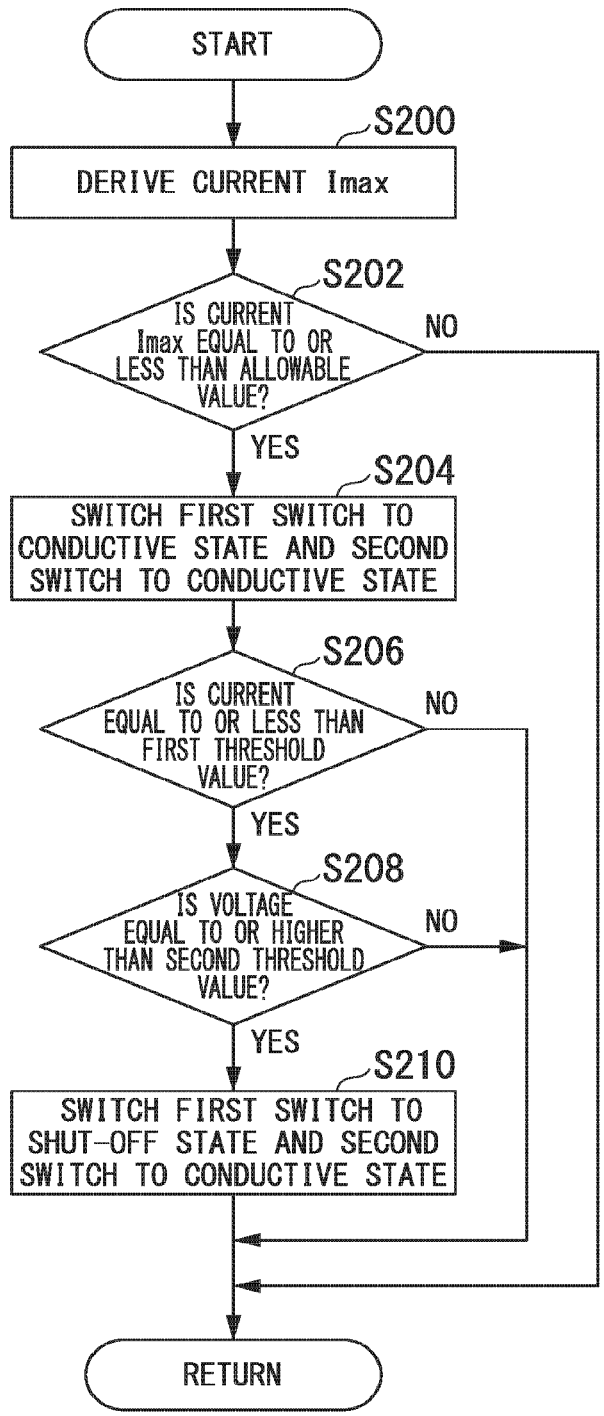
FIG. 4 is a flowchart illustrating a flow of a process executed by the charging/discharging controller of a second embodiment.

FIG. 4 is a flowchart illustrating a flow of a process executed by the charging/discharging controller 64 of the second embodiment. Steps S200 to S206 of the flowchart of FIG. 4 are the same processes as the processes of steps S100 to S106 of the flowchart of FIG. 2, and thus description thereof will be omitted.

If the received current is equal to or less than the first threshold value in step S206, the charging/discharging controller 64 determines whether a voltage detected by the internal voltage detector 14 is equal to or higher than the second threshold (step S208). If the voltage detected by the internal voltage detector 14 is not equal to or higher than the second threshold, the process of one routine of the flowchart ends.

If the voltage detected by the internal voltage detector 14 is equal to or higher than the second threshold, the charging/discharging controller 64 controls the first switch 22 to switch to the shut-off state and controls the second switch 32 to switch to the conductive state (step S210). Accordingly, the process of one routine of the flowchart ends.

Accordingly, when the voltage is less than the second threshold value, even if the charging current is equal to or less than the first threshold value, charging of the battery 12 is allowed. For example, in the case of a backup power supply, it may be desirable to avoid a case in which charging using a weak current is prohibited in a state in which SOC is low and thus necessary SOC is not secured. The charging/discharging controller 64 of the present embodiment allows charging using a weak current if the voltage is less than the second threshold value and thus is suitable to secure necessary SOC. Meanwhile, recovered discharge capacity deteriorates due to a weak current at a high voltage (a voltage equal to or higher than the second threshold value) at which activity of materials in the electrolyte of the battery is high, in general.

According to the second embodiment described above, the charging/discharging controller 64 can obtain the effects of the first embodiment and perform charging when the influence on deterioration of the battery is insignificant.

Third Embodiment

A third embodiment will be described below. In the third embodiment, the charging/discharging controller 64 controls the first switch 22 to switch to the shut-off state if a charging current detected by the current detector 16 is equal to or less than the first threshold value and charge capacity estimated by the estimator 62 is equal to or higher than a third threshold value. Hereinafter, a description will be given on the basis of differences from the first embodiment.

Figure 5:
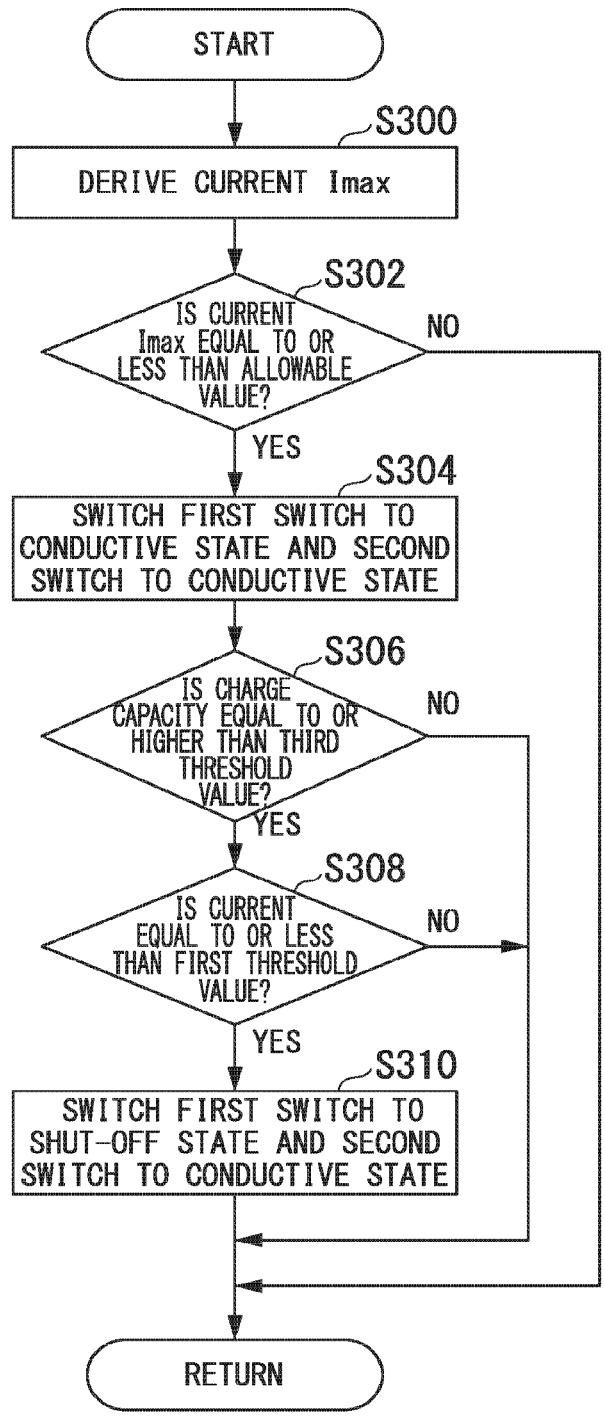
FIG. 5 is a flowchart illustrating a flow of a process executed by the charging/discharging controller of a third embodiment.

FIG. 5 is a flowchart illustrating a flow of a process executed by the charging/discharging controller 64 of the third embodiment. Steps S300 to S304 of the flowchart of FIG. 5 are the same processes as the processes of steps S100 to S104 of the flowchart of FIG. 2, and thus description thereof is omitted.

After the process of step S304, the charging/discharging controller 64 determines whether charge capacity estimated by the estimator 62 is equal to or higher than the third threshold value (step S306). If the charge capacity estimated by the estimator 62 is not equal to or higher than the third threshold value, the process of one routine of the flowchart ends.

If the charge capacity estimated by the estimator 62 is equal to or higher than the third threshold value, the charging/discharging controller 64 determines whether a charging current detected by the current detector 16 is equal to or less than the first threshold value (step S308). If the charging current detected by the current detector 16 is not equal to or less than the first threshold value, the process of one routine of the flowchart ends. If the charging current detected by the current detector 16 is equal to or less than the first threshold value, the charging/discharging controller 64 controls the first switch 22 to switch to the shut-off state and controls the second switch 32 to switch to the conductive state (step S310). Accordingly, the process of one routine of the flowchart ends.

Accordingly, if the charge capacity is equal to or higher than the third threshold value, whether the current is equal to or less than the first threshold value is determined to suppress the progress of deterioration of the battery, particularly, when the charge capacity is estimated as a charge capacity which causes a weak current to be easily generated.

Meanwhile, the charging/discharging controller 64 may change the first threshold value on the basis of the charge capacity estimated by the estimator 62. For example, the charging/discharging controller 64 maintains the first threshold value if the charge capacity estimated by the estimator 62 is equal to or higher than a predetermined value and changes the first threshold value to a threshold value smaller than the first threshold value when the charge capacity estimated by the estimator 62 is less than the predetermined value. Accordingly, a weak current is interrupted when charge capacity of the battery is relatively high, which is easily affected by the weak current, whereas the weak current is not interrupted when charge capacity of the battery which is relatively low, which is not easily affected by the weak current compared to a case in which charge capacity is high, thereby realizing control in response to the charge capacity.

According to the above-described third embodiment, when the charging current is equal to or less than the first threshold value and the charge capacity is equal to or higher than the third threshold value, the charging/discharging controller 64 can obtain the effects of the first embodiment by controlling the first switch 22 to switch to the shut-off state and can perform charging using a weak current in a state in which the influence on the progress of deterioration of the battery is relatively insignificant.

Fourth Embodiment

A fourth embodiment will be described below. In the fourth embodiment, the charging/discharging controller 64 controls the first switch 22 to switch to the shut-off state when a current equal to or less than the first threshold value is detected by the current detector 16, a voltage equal to or higher than the second threshold value is detected by the internal voltage detector 14, and charge capacity equal to or higher than the third threshold value is estimated by the estimator 62. Hereinafter, a description will be given on the basis of differences from the first embodiment.

Figure 6:
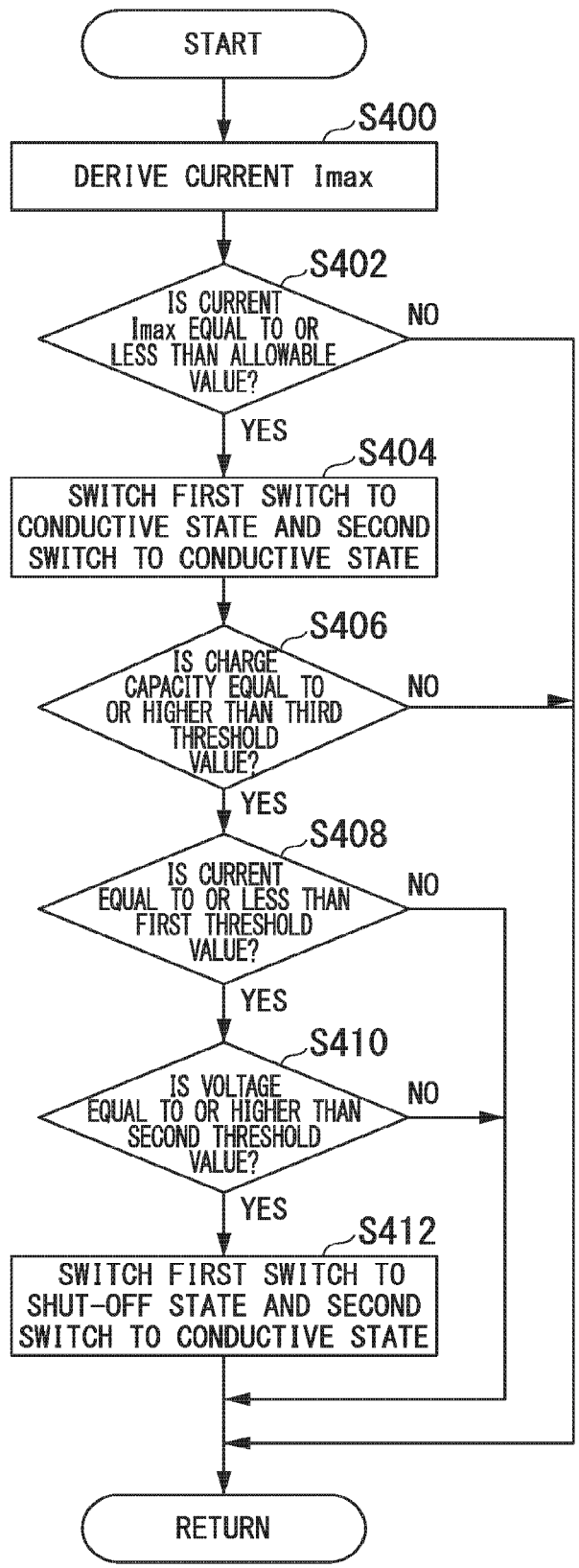
FIG. 6 is a flowchart illustrating a flow of a process executed by the charging/discharging controller of a fourth embodiment.

FIG. 6 is a flowchart illustrating a flow of a process executed by the charging/discharging controller 64 of the fourth embodiment. Steps S400 to S404 of the flowchart of FIG. 6 are the same processes as the processes of steps S100 to S104 of the flowchart of FIG. 2, and thus description thereof is omitted.

After the process of step S404, the charging/discharging controller 64 determines whether charge capacity estimated by the estimator 62 is equal to or higher than the third threshold value (step S406). If the charge capacity estimated by the estimator 62 is not equal to or higher than the third threshold value, the process of one routine of the flowchart ends.

If the charge capacity estimated by the estimator 62 is equal to or higher than the third threshold value, the charging/discharging controller 64 determines whether the charging current detected by the current detector 16 is equal to or less than the first threshold value (step S408). If the charging current is not equal to or less than the first threshold value, the process of one routine of the flowchart ends. If the charging current is equal to or less than the first threshold value, the charging/discharging controller 64 determines whether the voltage detected by the internal voltage detector 14 is equal to or higher than the second threshold value (step S410). If the voltage detected by the internal voltage detector 14 is not equal to or higher than the second threshold value, the process of one routine of the flowchart ends.

If the voltage detected by the internal voltage detector 14 is equal to or higher than the second threshold value, the charging/discharging controller 64 controls the first switch 22 to switch to the shut-off state and controls the second switch 32 to switch to the conductive state (step S412). Accordingly, the process of one routine of the flowchart ends.

In this manner, the charging/discharging controller 64 determines whether to interrupt a weak current on the basis of the charge capacity of the battery 12, presence or absence of the weak current, and the voltage detected by the internal voltage detector 14, and thus can interrupt the weak current and realize control further reflecting the state of the battery 12.

According to the above-described fourth embodiment, If the charging current is equal to or less than the first threshold value, the voltage is equal to or higher than the second threshold value, and the charge capacity is equal to or higher than the third threshold value, the charging/discharging controller 64 can obtain the effects of the first embodiment and more appropriately interrupt a weak current in response to the state of the battery 12 by controlling the first switch 22 to switch to the shut-off state.

According to at least one of the above-described embodiments, it is possible to suppress the progress of deterioration of the battery 12 by using the first switch 22 connected between the battery 12 and the positive electrode terminal 52, the current detector 16 which detects a current charged in at least the battery 12, and the charging/discharging controller 64 which charges the battery 12 by controlling the first switch 22 to switch to the conductive state, and If the charging current detected by the current detector 16 when the battery 12 is charged is equal to or less than the first threshold value, controls the first switch 22 to switch to the shut-off state to interrupt the current flowing to the battery 12.

While certain embodiments battery pack have been described, these embodiments have been presented by way of example only, and are not intended to limit the scope of the inventions. Indeed, the novel: embodiments described herein may be embodied in a variety of other forms; furthermore, various omissions substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery pack comprising:
a housing;
a battery in the housing;
a first switch connected to the battery in the housing;
a current detector configured to detect a current flowing to the battery, the current detector being in the housing;
a controller configured to control the first switch to switch to a conductive state to flow the current to the battery if the current flowing to the battery detected by the current detector is higher than a first threshold value, and control the first switch to switch to a shut-off state to interrupt the current to the battery if the current flowing to the battery detected by the current detector is equal to or less than the first threshold value, the controller being in the housing;
an estimator configured to estimate charge capacity of the battery, wherein the controller configured to:
control the first switch to switch to the shut-off state if the current flowing to the battery detected by the current detector is equal to or less than the first threshold value and the charge capacity estimated by the estimator is equal to or higher than a third threshold value; and
control the first switch to switch to the conductive state if the current flowing to the battery detected by the current detector is higher than the first threshold value or the charge capacity estimated by the estimator is less than the third threshold value.

2. The battery pack according to claim 1, wherein the battery has a higher charge efficiency or discharge efficiency per unit time than a lead battery.

3. The battery pack according to claim 2, further comprising a voltage detector configured to detect a voltage of the battery,
wherein the controller configured to:
control the first switch to switch to the shut-off state if the current flowing to the battery detected by the current detector is equal to or less than the first threshold value and the voltage detected by the voltage detector is equal to or higher than a second threshold value; and
control the first switch to switch to the conductive state if the current flowing to the battery detected by the current detector is higher than the first threshold value or the voltage detected by the voltage detector is less than the second threshold value.

4. The battery pack according to claim 2, further comprising an estimator configured to estimate charge capacity of the battery,
wherein the controller configured to:
control the first switch to switch to the shut-off state if the current flowing to the battery detected by the current detector is equal to or less than the first threshold value and the charge capacity estimated by the estimator is equal to or higher than a third threshold value; and
control the first switch to switch to the conductive state if the current flowing to the battery detected by the current detector is higher than the first threshold value or the charge capacity estimated by the estimator is less than the third threshold value.

5. The battery pack according to claim 2, further comprising:
a voltage detector configured to detect a voltage of the battery; and
an estimator configured to estimate charge capacity of the battery,
wherein the controller configured to:
control the first switch to switch to the shut-off state if the current flowing to the battery detected by the current detector is equal to or less than the first threshold value, the voltage detected by the voltage detector is equal to or higher than a second threshold value, and the charge capacity estimated by the estimator is equal to or higher than a third threshold value; and
control the first switch to switch to the conductive state if the current flowing to the battery detected by the current detector is higher than the first threshold value, the voltage detected by the voltage detector is less than the second threshold value, or the charge capacity estimated by the estimator is less than the third threshold value.

6. The battery pack according to claim 2, further comprising a second switch connected to the battery,
wherein the controller configured to control the first switch to switch to the shut-off state to interrupt the current flowing to the battery and control the second switch to switch to the conductive state to allow discharging of the battery.

7. The battery pack according to claim 1, further comprising a voltage detector configured to detect a voltage of the battery,
wherein the controller configured to:
control the first switch to switch to the shut-off state if the current flowing to the battery detected by the current detector is equal to or less than the first threshold value and the voltage detected by the voltage detector is equal to or higher than a second threshold value; and
control the first switch to switch to the conductive state if the current flowing to the battery detected by the current detector is higher than the first threshold value or the voltage detected by the voltage detector is less than the second threshold value.

8. The battery pack according to claim 1, further comprising:
a voltage detector configured to detect a voltage of the battery; and
an estimator configured to estimate charge capacity of the battery,
wherein the controller configured to:
control the first switch to switch to the shut-off state if the current flowing to the battery detected by the current detector is equal to or less than the first threshold value, the voltage detected by the voltage detector is equal to or higher than a second threshold value, and the charge capacity estimated by the estimator is equal to or higher than a third threshold value; and
control the first switch to switch to the conductive state if the current flowing to the battery detected by the current detector is higher than the first threshold value, the voltage detected by the voltage detector is less than the second threshold value, or the charge capacity estimated by the estimator is less than the third threshold value.

9. The battery pack according to claim 1, further comprising a second switch connected to the battery,
wherein the controller configured to control the first switch to switch to the shut-off state to interrupt the current flowing to the battery and control the second switch to switch to the conductive state to allow discharging of the battery.

10. A battery pack comprising:
a housing;
a battery in the housing;
a first switch connected to the battery in the housing;
a current detector configured to detect a current flowing to the battery, the current detector being in the housing;
a controller configured to control the first switch to switch to a conductive state to flow the current to the battery if the current flowing to the battery detected by the current detector is higher than a first threshold value, and control the first switch to switch to a shut-off state to interrupt the current to the battery if the current flowing to the battery detected by the current detector is equal to or less than the first threshold value, the controller being in the housing;
a voltage detector configured to detect a voltage of the battery; and
an estimator configured to estimate charge capacity of the battery,
wherein the controller configured to:
control the first switch to switch to the shut-off state if the current flowing to the battery detected by the current detector is equal to or less than the first threshold value, the voltage detected by the voltage detector is equal to or higher than a second threshold value, and the charge capacity estimated by the estimator is equal to or higher than a third threshold value; and
control the first switch to switch to the conductive state if the current flowing to the battery detected by the current detector is higher than the first threshold value, the voltage detected by the voltage detector is less than the second threshold value, or the charge capacity estimated by the estimator is less than the third threshold value.

11. The battery pack according to claim 10, wherein the battery has a higher charge efficiency or discharge efficiency per unit time than a lead battery.

12. The battery pack according to claim 11, further comprising a voltage detector configured to detect a voltage of the battery,
wherein the controller configured to:
control the first switch to switch to the shut-off state if the current flowing to the battery detected by the current detector is equal to or less than the first threshold value and the voltage detected by the voltage detector is equal to or higher than a second threshold value; and
control the first switch to switch to the conductive state if the current flowing to the battery detected by the current detector is higher than the first threshold value or the voltage detected by the voltage detector is less than the second threshold value.

13. The battery pack according to claim 11, further comprising an estimator configured to estimate charge capacity of the battery,
wherein the controller configured to:
control the first switch to switch to the shut-off state if the current flowing to the battery detected by the current detector is equal to or less than the first threshold value and the charge capacity estimated by the estimator is equal to or higher than a third threshold value; and
control the first switch to switch to the conductive state if the current flowing to the battery detected by the current detector is higher than the first threshold value or the charge capacity estimated by the estimator is less than the third threshold value.

14. The battery pack according to claim 11, further comprising:
a voltage detector configured to detect a voltage of the battery; and
an estimator configured to estimate charge capacity of the battery,
wherein the controller configured to:
control the first switch to switch to the shut-off state if the current flowing to the battery detected by the current detector is equal to or less than the first threshold value, the voltage detected by the voltage detector is equal to or higher than a second threshold value, and the charge capacity estimated by the estimator is equal to or higher than a third threshold value; and
control the first switch to switch to the conductive state if the current flowing to the battery detected by the current detector is higher than the first threshold value, the voltage detected by the voltage detector is less than the second threshold value, or the charge capacity estimated by the estimator is less than the third threshold value.

15. The battery pack according to claim 11, further comprising a second switch connected to the battery, wherein the controller configured to control the first switch to switch to the shut-off state to interrupt the current flowing to the battery and control the second switch to switch to the conductive state to allow discharging of the battery.

16. The battery pack according to claim 10, further comprising a voltage detector configured to detect a voltage of the battery,
wherein the controller configured to:
control the first switch to switch to the shut-off state if the current flowing to the battery detected by the current detector is equal to or less than the first threshold value and the voltage detected by the voltage detector is equal to or higher than a second threshold value; and
control the first switch to switch to the conductive state if the current flowing to the battery detected by the current detector is higher than the first threshold value or the voltage detected by the voltage detector is less than the second threshold value.

17. The battery pack according to claim 10, further comprising a second switch connected to the battery,
wherein the controller configured to control the first switch to switch to the shut-off state to interrupt the current flowing to the battery and control the second switch to switch to the conductive state to allow discharging of the battery.

18. A battery pack comprising:
a housing;
a battery in the housing;
a first switch connected to the battery in the housing;
a current detector configured to detect a current flowing to the battery, the current detector being in the housing;
a voltage detector configured to detect a voltage of the battery, the voltage detector being in the housing;
the controller configured to:
control the first switch to switch to the shut-off state if the current flowing to the battery detected by the current detector is equal to or less than the first threshold value and the voltage detected by the voltage detector is equal to or higher than a second threshold value;
control the first switch to switch to the conductive state if the current flowing to the battery detected by the current detector is higher than the first threshold value, and
control the first switch to switch to the conductive state if the current flowing to the battery detected by the current detector is equal to or less than the first threshold value and the voltage detected by the voltage detector is less than the second threshold value.

19. The battery pack according to claim 18, wherein the battery has a higher charge efficiency or discharge efficiency per unit time than a lead battery.

* * * * *